(12) United States Patent
Gendreau

(10) Patent No.: US 12,502,211 B1
(45) Date of Patent: Dec. 23, 2025

(54) IMPLANT DEVICE FOR A TIBIAL PLATEAU LEVELING OSTEOTOMY

(71) Applicant: The TPLO Company LLC, Carson City, NV (US)

(72) Inventor: Claude Luc Gendreau, Highland, IN (US)

(73) Assignee: TPLO COMPANY LLC, Carson City, NV (US)

( * ) Notice: Subject to any disclaimer, the term of this patent is extended or adjusted under 35 U.S.C. 154(b) by 0 days.

(21) Appl. No.: 19/029,561

(22) Filed: Jan. 17, 2025

(51) Int. Cl.
| | |
|---|---|
| *A61B 17/56* | (2006.01) |
| *A61B 17/17* | (2006.01) |
| *A61B 17/58* | (2006.01) |
| *A61B 17/80* | (2006.01) |
| *A61F 2/28* | (2006.01) |

(52) U.S. Cl.
CPC ...... *A61B 17/8061* (2013.01); *A61B 17/1728* (2013.01); *A61B 17/80* (2013.01); *A61F 2/2846* (2013.01); *A61F 2002/2892* (2013.01)

(58) Field of Classification Search
CPC . A61B 17/80; A61B 17/8061; A61B 17/8095; A61F 2/28; A61F 2002/2892
See application file for complete search history.

(56) References Cited

U.S. PATENT DOCUMENTS

| | | |
|---|---|---|
| 4,677,973 A | 7/1987 | Slocum |
| 4,762,122 A | 8/1988 | Slocum |

(Continued)

FOREIGN PATENT DOCUMENTS

| | | |
|---|---|---|
| AU | 2023222926 A1 | 3/2024 |
| DE | 10015734 A1 | 9/2001 |

(Continued)

OTHER PUBLICATIONS

Dallago, M., et al., "Effect of Plate Type on Tibial Plateau Levelling and Medialization Osteotomy for Treatment of Cranial Cruciate Ligament Rupture and Concomitant Medial Patellar Luxation in Small Breed Dogs: An In Vitro Study", Vet. Comp. Orthop. Traumatol., published May 2, 2023, 36(04), pp. 212-217, Georg Thieme Verlag KG, Stuttgart, Germany.

(Continued)

*Primary Examiner* — Nicholas W Woodall
(74) *Attorney, Agent, or Firm* — Miller, Canfield, Paddock and Stone, P.L.C.

(57) ABSTRACT

An implant device that includes: an epiphyseal and a metaphyseal tibial plate section comprising at least two screw holes and a bone-contacting surface, each screw hole for securing the respective plate section to a respective epiphyseal or metaphyseal tibial bone fragment; and a ligament configured to join the tibial plate sections and span a curvilinear tibial cut between the bone fragments that has a curvilinear cut radius. Each of the tibial plate sections comprises a tibial plate length and width, and each length is at least two times longer than the respective width. Further, the width of each of the tibial plate sections is substantially uniform along the length of each of the respective plate sections. In addition, each of the tibial plate sections comprises a cut-adjacent curvilinear surface that is substantially normal to its bone-contacting surface and comprises a plate radius within ±25% of the curvilinear cut radius.

30 Claims, 7 Drawing Sheets

(56) References Cited

U.S. PATENT DOCUMENTS

| | | |
|---|---|---|
| 4,800,874 A | 1/1989 | David |
| 4,867,144 A | 9/1989 | Karas |
| 4,988,350 A | 1/1991 | Herzberg |
| 5,304,180 A | 4/1994 | Slocum |
| 5,749,872 A | 5/1998 | Kyle |
| 5,868,749 A | 2/1999 | Reed |
| 5,904,684 A | 5/1999 | Rooks |
| 6,077,266 A | 6/2000 | Medoff |
| 6,096,040 A | 8/2000 | Esser |
| 6,623,486 B1 | 9/2003 | Weaver |
| 6,902,567 B2 | 6/2005 | Del Medico |
| 7,090,676 B2 | 8/2006 | Huebner |
| 7,189,237 B2 | 3/2007 | Huebner |
| 7,267,678 B2 | 9/2007 | Medoff |
| 7,951,178 B2 | 5/2011 | Jensen |
| 8,177,818 B2 | 5/2012 | Wotton, III |
| 8,523,921 B2 | 9/2013 | Horan |
| 8,753,343 B2 | 6/2014 | Staeubli |
| 9,271,773 B2 | 3/2016 | Hwa et al. |
| 10,258,396 B2 | 4/2019 | Kanzanovicz |
| 10,299,841 B2 | 5/2019 | Dunlop |
| 10,864,026 B2 | 12/2020 | Wotton, III |
| 11,026,728 B2 | 6/2021 | Horan |
| 11,096,729 B2 | 8/2021 | Dunlop |
| 11,123,119 B2 | 9/2021 | Dunlop |
| 11,207,112 B2 | 12/2021 | Dunlop |
| 11,298,167 B2 | 4/2022 | Dunlop |
| 11,317,953 B2 | 5/2022 | Dunlop |
| 11,337,740 B2 | 5/2022 | Silva |
| 11,357,553 B2 | 6/2022 | Paton |
| 11,419,648 B2 | 8/2022 | Dunlop |
| 2002/0156474 A1 | 10/2002 | Wack |
| 2004/0116930 A1 | 6/2004 | O'Driscoll |
| 2004/0193165 A1 | 9/2004 | Orbay |
| 2004/0225291 A1 | 11/2004 | Schwammberger |
| 2005/0010226 A1 | 1/2005 | Grady, Jr. |
| 2005/0015089 A1 | 1/2005 | Young |
| 2005/0216008 A1 | 9/2005 | Zwirnmann et al. |
| 2005/0240187 A1 | 10/2005 | Huebner |
| 2006/0009771 A1 | 1/2006 | Orbay |
| 2006/0149275 A1 | 7/2006 | Cadmus |
| 2006/0173458 A1 | 8/2006 | Forstein |
| 2006/0229621 A1* | 10/2006 | Cadmus ............. A61B 17/1728 606/87 |
| 2007/0083204 A1 | 4/2007 | Sidebotham |
| 2010/0152783 A1 | 6/2010 | Borostyankoi |
| 2011/0093018 A1* | 4/2011 | Prasad ............... A61B 17/8014 606/282 |
| 2013/0090694 A1* | 4/2013 | Norris ................ A61B 17/8085 606/281 |
| 2015/0127011 A1 | 5/2015 | Dunlop et al. |
| 2019/0358039 A1* | 11/2019 | Ducharme ........... A61B 17/863 |
| 2019/0374266 A1 | 12/2019 | Paton |
| 2020/0253653 A1 | 8/2020 | Wotton, III |
| 2021/0085380 A1 | 3/2021 | Daye |
| 2021/0212738 A1 | 7/2021 | Daye |
| 2021/0298806 A2 | 9/2021 | Daye |
| 2021/0338293 A1 | 11/2021 | Silva |
| 2021/0361331 A1 | 11/2021 | Daye |
| 2022/0338909 A1 | 10/2022 | Dunlop |
| 2024/0058042 A1* | 2/2024 | Damron ............. A61B 17/8085 |

FOREIGN PATENT DOCUMENTS

| | | |
|---|---|---|
| EP | 2937051 A1 | 4/2014 |
| FR | 2405062 A1 | 5/1979 |
| FR | 2405705 A1 | 5/1979 |
| FR | 2406429 A1 | 5/1979 |
| KR | 102313246 B1 | 10/2021 |
| TW | M525169 U | 7/2016 |
| WO | 0119267 A1 | 3/2001 |
| WO | 03013623 A1 | 2/2003 |
| WO | 2004024009 A1 | 3/2004 |
| WO | 2005048888 A1 | 6/2005 |
| WO | 2007137437 A2 | 12/2007 |
| WO | 2022204552 A1 | 9/2022 |

OTHER PUBLICATIONS

Animal Surgical Center of Michigan, "Tibial Plateau Leveling Osteotomy—TPLO", available at https://www.animalsurgicalcenter.com/tibial-plateau-leveling-osteotomy-tplo, accessed Apr. 10, 2024.

Veterinary Orthopedic Implants, Inc., "Catalog 2019", pp. i-iii, 2.12-2.17, 5.3-5.4, 5.9-6.25, and 10.8.

Veterinary Orthopedic Implants, Inc., "Catalog 2021-2022", pp. i-v, and 1.10-1.22.

Veterinary Orthopedic Implants, Inc., "Product Catalog 2023", 2023, pp. i-iii, and 10-18.

Kyon AG, "Product Catalog 2023", 2023, pp. i-iii, and 39-42.

Movora LLC, "Product Catalog 2023", 2023, pp. i-vii, 27-29, 156-157, and 241-249.

* cited by examiner

IMPLANT DEVICE FOR A TIBIAL PLATEAU LEVELING OSTEOTOMY

FIELD OF THE DISCLOSURE

The present disclosure relates to a surgical implant device used as part of a tibial plateau leveling osteotomy (TPLO) procedure and, more specifically, a compact implant device for an animal (e.g., a canine) undergoing a tibial plateau leveling osteotomy (TPLO) procedure that reduces incision size, procedure duration, the risk of infection, and provides a more secure fixation.

BACKGROUND

As is well known in the field, the cranial cruciate ligament (CCL) in many animals can partially rupture, fully rupture, or otherwise degenerate over time. The CCL provides stability to the animal's stifle joint by preventing backward movement of the femur relative to the tibia. Various breeds of dogs and other animals are born with or otherwise develop an exaggerated backward slope of the upper surface (plateau) of their tibia bones. This slope contributes to stress on the CCL ligament, often leading to its rupture or degeneration. Once the CCL ligament is compromised, the animal experiences pain and arthritis can quickly develop in the stifle joint.

Various TPLO implant devices are known in the field to stabilize the bone fragments in their new position following an osteotomy. During a typical TPLO procedure, a veterinary surgeon will make a curvilinear cut within the tibia, relatively close to the tibial plateau and stifle joint, separating metaphyseal and epiphyseal sections of the tibial bone. After the curvilinear cut to the tibia is completed, the surgeon then rotates the tibial plateau of the epiphyseal section relative to the metaphyseal section of the tibia to an optimal angle to reduce stress on the CCL ligament in the stifle joint. An implant device is then used to secure the new orientation of the epiphyseal section of the tibia relative to the metaphyseal section of the tibia with a plate attached to each bone section. The implant device is left in the animal after the TPLO procedure until the osteotomy is healed or indefinitely if there is no rejection of the implant and no infection.

The conventional implant devices employed in TPLO procedures have several disadvantages and problems. Most such implant devices employ a plate with an elongated appendage or protrusion affixed to the metaphyseal (distal) section of the tibia, ostensibly to ensure that the plate is securely affixed to the metaphyseal section of the tibia. However, the additional length of the appendage or protrusion of these implant devices necessitates a long surgical exposure, which can extend recovery times and lead to an increased likelihood of infection and implant rejection. Further, these relatively bulky conventional implant devices can result in lengthier TPLO procedures, which increase infection risk.

Accordingly, there is a need for a more compact implant device design for TPLO procedures that reduces incision size, the duration of the procedure, and the risk of post-surgery infections and other complications. Such a device should further provide a more uniform securement of the epiphyseal and metaphyseal fragments separated by the curvilinear cut between the two tibial sections during and after recovery.

SUMMARY

According to an aspect of the disclosure, an implant device for a tibial plateau leveling osteotomy is provided that includes: an epiphyseal tibial plate section comprising at least two screw holes and a bone-contacting surface, each screw hole of the epiphyseal tibial plate section configured to accept a bone screw to secure the plate section to the epiphyseal tibial bone fragment; a metaphyseal tibial plate section comprising at least two screw holes and a bone-contacting surface, each screw hole of the metaphyseal tibial plate section configured to accept a bone screw to secure the plate section to a metaphyseal tibial bone fragment; and a ligament configured to join the two tibial plate sections and span a curvilinear tibial cut, wherein the curvilinear cut comprises a curvilinear cut radius and separates the epiphyseal and metaphyseal tibial bone fragments. Each of the metaphyseal and epiphyseal tibial plate sections and the ligament comprises an implant grade alloy. Further, the epiphyseal tibial plate section comprises an epiphyseal tibial plate length and width, the metaphyseal tibial plate comprises a metaphyseal tibial plate length and width, and each tibial plate length is at least two times longer than the respective tibial plate width. The width of each of the tibial plate sections is substantially uniform along the length of each of the respective tibial plate sections. In addition, each of the tibial plate sections comprises a cut-adjacent curvilinear surface that is substantially normal to its bone-contacting surface, the curvilinear surface comprising a plate radius within ±25% of the curvilinear cut radius.

According to an aspect of the disclosure, an implant device for a tibial plateau leveling osteotomy is provided that includes: an epiphyseal tibial plate section comprising at least two screw holes and a bone-contacting surface, each screw hole of the epiphyseal tibial plate section configured to accept a bone screw to secure the plate section to an epiphyseal tibial bone fragment; a metaphyseal tibial plate section comprising at least two screw holes and a bone-contacting surface, each screw hole of the metaphyseal tibial plate configured to accept a bone screw to secure the plate section to a metaphyseal bone fragment; and a ligament configured to join the two tibial plate sections and to span a curvilinear tibial cut, wherein the curvilinear cut comprises a curvilinear cut radius and separates the epiphyseal and metaphyseal tibial fragments. Each of the epiphyseal and metaphyseal tibial plate sections and the ligament comprises an implant grade alloy. Further, the epiphyseal tibial plate section comprises an epiphyseal tibial plate length and width, the metaphyseal tibial plate section comprises a metaphyseal tibial plate length and width, and each tibial plate section length is at least two times longer than the respective tibial plate width. The width of each of the plate sections is substantially uniform along the length of each of the respective tibial plate sections. In addition, the epiphyseal tibial plate section length is shorter than the metaphyseal tibial plate section length.

According to an aspect of the disclosure, an implant device for a tibial plateau leveling osteotomy is provided that consists essentially of: an epiphyseal tibial plate section comprising at least two screw holes and a bone-contacting surface, each screw hole of the epiphyseal tibial plate configured to accept a bone screw to secure the epiphyseal plate section to an epiphyseal tibial bone fragment; a metaphyseal tibial plate section comprising at least two screw holes and a bone-contacting surface, each screw hole of the metaphyseal tibial plate section configured to accept a bone screw to secure the metaphyseal plate section to a metaphyseal tibial bone fragment; and a ligament configured to join the tibial plate sections and to span a curvilinear tibial cut, wherein the curvilinear cut comprises a curvilinear cut radius and separates the epiphyseal and metaphyseal tibial fragments. Each of the epiphyseal and metaphyseal tibial plate sections and the ligament comprises an implant grade alloy. Further, the epiphyseal tibial plate section comprises an epiphyseal tibial plate length and width, the metaphyseal tibial plate section comprises a metaphyseal tibial plate length and width, and each tibial plate section length is at least two times longer than the respective tibial plate width. In addition, the width of each of the plate sections is substantially uniform along the length of each of the respective tibial plate sections.

According to an aspect of the disclosure, an implant device for a tibial plateau leveling osteotomy is provided that includes: an epiphyseal tibial plate section comprising at least two screw holes and a bone-contacting surface, each screw hole of the epiphyseal tibial plate configured to accept a bone screw to secure the epiphyseal plate section to an epiphyseal tibial bone fragment; a metaphyseal tibial plate section comprising at least two screw holes and a bone-contacting surface, each screw hole of the metaphyseal tibial plate section configured to accept a bone screw to secure the metaphyseal plate section to a metaphyseal tibial bone fragment; and a ligament configured to join the tibial plate sections and to span a curvilinear tibial cut, wherein the curvilinear cut comprises a curvilinear cut radius and separates the epiphyseal and metaphyseal tibial fragments. Each of the epiphyseal and metaphyseal tibial plate sections and the ligament comprises an implant grade alloy. Further, the epiphyseal tibial plate section comprises an epiphyseal tibial plate length and width, the metaphyseal tibial plate section comprises a metaphyseal tibial plate length and width, and each tibial plate section length is at least two times longer than the respective tibial plate width. In addition, the width of each of the plate sections is substantially uniform along the length of each of the respective tibial plate sections. Further, one or both of the tibial plate sections comprises a support protrusion, the support protrusion comprising a screw hole and emanating from a surface of the plate section opposite to a cut-adjacent curvilinear surface of the plate section that is substantially normal to its bone-contacting surface.

Additional features and advantages will be set forth in the detailed description which follows, and in part will be readily apparent to those skilled in the art from that description or recognized by practicing the embodiments as described herein, including the detailed description which follows, the claims, as well as the appended drawings.

BRIEF DESCRIPTION OF THE DRAWINGS

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments, wherein:

DETAILED DESCRIPTION

Figure 1A:
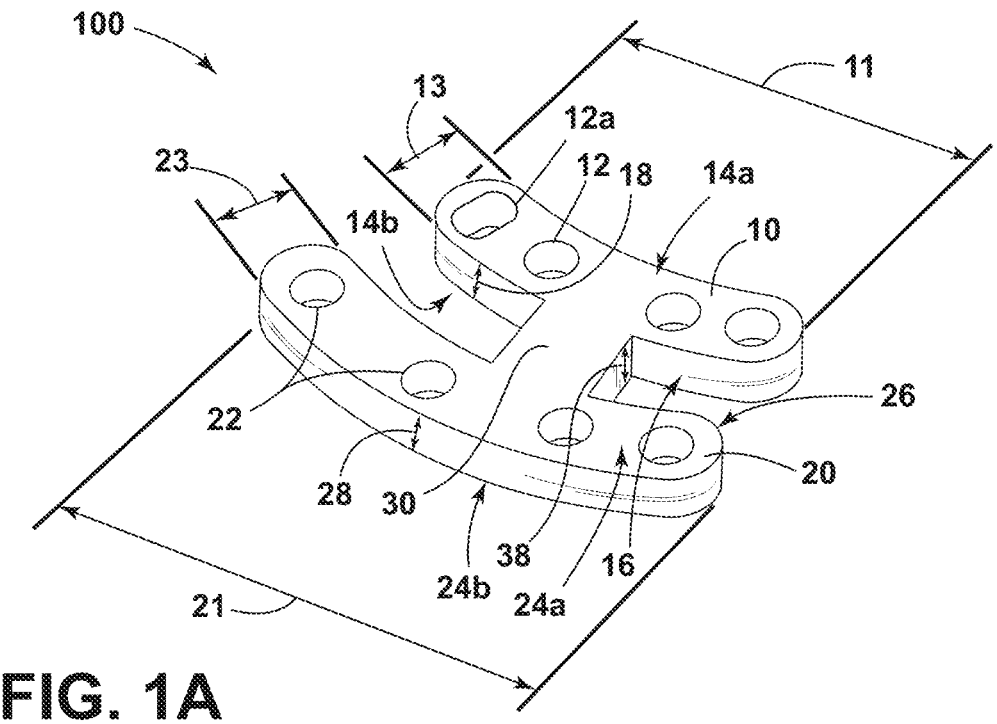
FIG. 1A is a perspective view of an implant device with epiphyseal and metaphyseal tibial plate sections and a ligament, according to an embodiment of the disclosure.
Figure 1B:
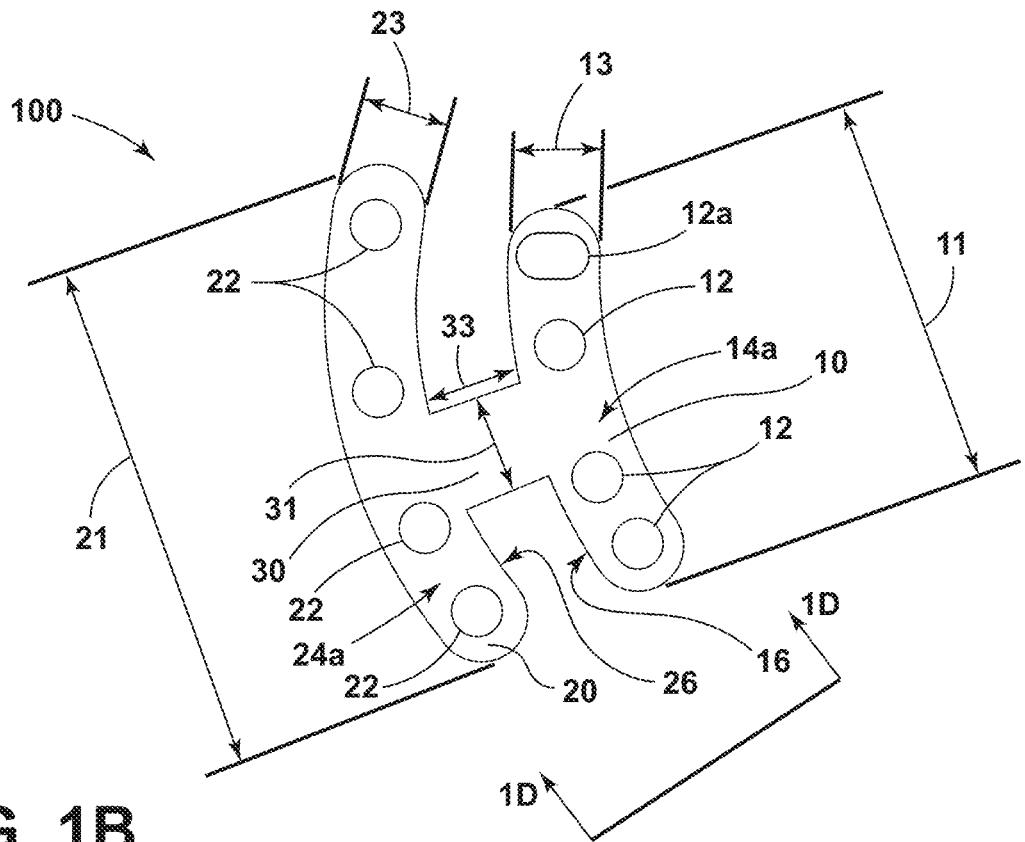
FIG. 1B is a top plan view of the implant device of FIG. 1A.
Figure 1C:
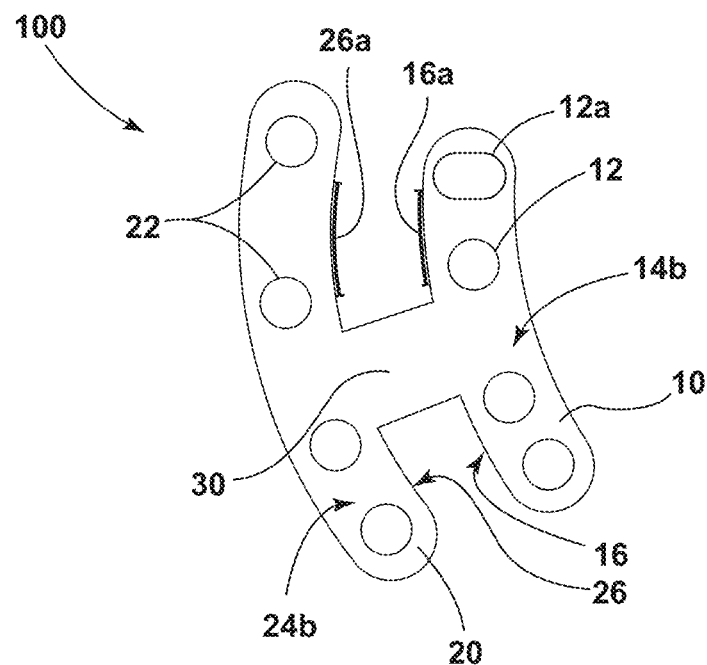
FIG. 1C is a bottom plan view of the implant device of FIG. 1A.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example "up," "down," "right," "left," "front," "back," "top," "bottom"—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including matters of logic with respect to arrangement of steps or operational flow; plain meaning derived from grammatical organization or punctuation; and the number or type of embodiments described in the specification.

As used herein, the singular forms "a," "an" and "the" include plural referents unless the context clearly dictates otherwise. Thus, for example, reference to a "component"

includes aspects having two or more such components, unless the context clearly indicates otherwise.

As also used herein, the term "substantially uniform", as used in connection with the width of one or more plate sections of the implant device of the disclosure, means that the width does not vary substantially along the length of the plate section. More specifically, a "substantially uniform" width of the plate section cannot vary by more than 100% of the width of the plate section at any one location along the length of the plate section. Consequently, one or more plate sections of the implant device of the disclosure may, in some implementations, possess one or more short, support protrusions or appendages (see FIG. 4); however, these short, support protrusions or appendages are limited in width to no more than 100% of the width of the plate section.

Generally, the present disclosure is directed to compact implant device designs for TPLO procedures that reduce incision size, procedure duration, and the risk of post-surgery infections and other complications. According to a typical TPLO procedure, a veterinary surgeon will make a curvilinear cut within the tibia, relatively close to the tibial plateau and stifle joint, and separate metaphyseal and epiphyseal sections of the tibial bone. The implant device designs of the disclosure maintain an effective, uniform securement of the curvilinear cut (i.e., as formed by the TPLO procedure) between the tibial sections during and after recovery of the animal (e.g., a canine).

Tibial plateau osteotomy implant devices of the disclosure comprise, or consist essentially of, an epiphyseal tibial plate section, a metaphyseal tibial plate section, and a ligament configured to join the tibial plate sections, with each of the plate sections and ligaments comprising an implant grade alloy. Each of the plate sections includes at least two screw holes, each screw hole configured to accept a bone screw to secure the respective plate section to the respective epiphyseal or metaphyseal tibial bone fragment. Further, the length of each of the plate sections is at least two times the width of each of the plate sections. In addition, the width of each of the plate sections is substantially uniform along the length of the plate section. In some aspects of these devices, each of the plate sections comprises a cut-adjacent curvilinear surface with a plate radius within ±25% of the curvilinear cut radius of the curvilinear cut between the tibial bone fragments. In some aspects of these devices, the epiphyseal tibial plate length is shorter than the metaphyseal tibial plate length.

The implant devices of the disclosure offer several advantages over conventional implant devices employed in TPLO procedures. The implant device configurations of the disclosure are compact, which facilitates relatively shorter incision sizes, shorter operation durations, lower infection risk, and lower risk of implant device rejection. Further, the implant device configurations of the disclosure are readily adaptable for TPLO procedures employed on animals of varying sizes (e.g., different dog breeds). In addition, the implant devices of the disclosure are expected to distribute stress more uniformly across the curvilinear cut to the tibia from the TPLO procedure.

Referring now to FIGS. 1A-1D, an implant device 100 for a TPLO procedure (see FIGS. 2A-2C, described further below) is depicted. The implant device 100 shown in FIGS. 1A-1D includes an epiphyseal tibial plate section 10 with at least two screw holes 12, an exterior surface 14a, and a bone-contacting surface 14b. Unless otherwise noted, each screw hole 12 of the epiphyseal tibial plate section 10 has a round shape and is configured to accept bone screws 180 to secure the plate section 10 to the epiphyseal tibial bone fragment 110 (see FIGS. 2A-2C). In some implementations of the implant device 100, one screw hole 12a (e.g., the proximal-most screw hole) of the epiphyseal tibial plate section 10 can be elongated in a direction perpendicular to a curvilinear cut 150 of the tibial bone, as shown in exemplary form in FIGS. 1A-1D. In general, the epiphyseal tibial plate section 10 is configured to attach to an epiphyseal tibial bone fragment 110 that results from the TPLO procedure and, particularly, a curvilinear cut 150 to a tibial bone. The epiphyseal tibial plate section 10 also functions to distribute stress (e.g., from movement of the tibia and stifle joint associated with movement by the animal) uniformly across a curvilinear tibial cut 150. In embodiments, the epiphyseal tibial plate section 10 has a curvilinear shape (see FIG. 1A), e.g., to generally match the shape of the curvilinear tibial cut 150. According to some embodiments, the epiphyseal tibial plate section 10 of the implant device 100 shown in FIGS. 1A-1D can comprise any of various shapes with a length 11 at least two times its width 13, including an elliptical, curved, curvilinear, or kidney bean-like shape.

Referring again to FIGS. 1A-1D, the TPLO implant device 100 further includes a metaphyseal tibial plate section 20 with at least two screw holes 22, an exterior surface 24a, and a bone-contacting surface 24b. Each screw hole 22 of the metaphyseal tibial plate section 20 is configured to accept a bone screw 180 to secure the plate section 20 to a metaphyseal tibial bone fragment 120 (see FIGS. 2A-2C, as described further below). The metaphyseal tibial plate section 20 is generally configured to secure a metaphyseal tibial bone fragment 120 defined from the TPLO procedure and, particularly, the curvilinear cut 150 to the tibial bone. The metaphyseal tibial plate section 20 also serves to distribute stress uniformly across the curvilinear tibial cut 150. In embodiments, the metaphyseal tibial plate section 20 has a curvilinear shape (see FIG. 1A), e.g., to generally match the shape of the curvilinear tibial cut 150. According to some embodiments, the metaphyseal tibial plate section 20 can comprise any of various shapes with a length 21 at least two times its width 23, including an elliptical, curved, curvilinear, or kidney bean-like shape. In some implementations, the shapes of the epiphyseal and metaphyseal tibial plate sections 10, 20 generally match and match the shape of the curvilinear tibial cut 150. In other implementations, the shapes of the plate sections 10, 20 can differ from one another.

In some embodiments of the implant device 100, as depicted in exemplary form in FIGS. 1A-1D, the metaphyseal tibial plate section 20 comprises an elliptical, curved, curvilinear, or kidney bean-like shape with no appendage or protrusion that extends in the proximal direction away from the curvilinear cut 150. Further, in these embodiments, the tibial plate sections 10, 20 can have a high aspect ratio of at least 2:1 to ensure that the device is compact in size. As noted earlier, the compact size of the implant device 100 can facilitate relatively straightforward TPLO procedures with small incision sizes, short durations, and lower infection risk. In addition, the compact size of the implant device 100 employing tibial plate sections 10, 20 with high aspect ratios (at least 2:1) and no appendages or protrusions emanating from the metaphyseal tibial plate section 20 also ensures that stresses can be uniformly distributed across the curvilinear cut 150, thus ensuring that the device 100 offers a stable securement of the epiphyseal bone fragment following the osteotomy.

Still referring to FIGS. 1A-1D, the TPLO implant device 100 further includes a ligament 30 configured to join the epiphyseal and metaphyseal tibial plate sections 10, 20. In embodiments, the ligament 30 is integral with the epiphyseal and metaphyseal tibial plate sections 10, 20 such that the implant device 100 can be fabricated from a single plate. In other embodiments (not shown), the ligament 30 is joined or otherwise secured to both of the tibial plate sections 10, 20 by any appropriate method as understood by those skilled in the field of the disclosure appropriate for the material(s) (e.g., an implant grade metal alloy) of each of the plate sections 10, 20 and ligament 30 (e.g., welding, fastening, brazing, riveting, hot-pressing, etc.).

Referring again to FIGS. 1A-1D, the ligament 30 of the TPLO implant device 100 is configured to span the curvilinear tibial cut 150, in addition to joining the epiphyseal and metaphyseal tibial plate sections 10, 20. The ligament 30 can be defined by a ligament length 31 defined along an axis substantially parallel to an axis defined by each of the epiphyseal and metaphyseal tibial plate section lengths 11, 21. The ligament 30 can also be defined by a ligament width 33, the width 33 dimension defined as being substantially normal to the ligament length 31. In some embodiments, the ligament length 31 is at least about 50% (e.g., a width 33 of ≤8 mm and plate section lengths 11, 21=16 mm), 60%, 70%, 80%, 90%, or 95% shorter than each of the tibial plate section lengths 11, 21, e.g., to ensure that the surgeon is able to observe the curvilinear cut 150 beside and/or through the ligament 30, and properly orient the TPLO implant device 100 during the TPLO procedure. Further, as depicted in exemplary form in FIGS. 1A-1D, the ligament 30 can comprise a single connection between the tibial plate sections 10, 20. In some implementations (not shown), the ligament 30 can comprise multiple bands, joints, ligaments, or other elements situated between the tibial plate sections 10, 20 to join them and facilitate visibility to the curvilinear cut 150 beneath the TPLO implant device 100. In such implementations, the multiple bands, joints, ligaments, or other elements collectively define the ligament length 31 and width 33.

Referring again to FIGS. 1A-1D, each of the metaphyseal and epiphyseal tibial plate sections 10, 20 and the ligament 30 can be fabricated from an implant grade alloy, as understood by those skilled in the field of the disclosure. Suitable implant grade alloys include stainless steel alloys (e.g., SS 316, SS 316LVM, SS 304, and 17-4 PH) titanium alloys (e.g., Ti-6Al-4V, Ti-6Al-7Nb, Grade 2, and Grade 4). Each of the tibial plate sections 10, 20 and ligament 30 can be fabricated from the same implant grade alloy. In addition, each of the bone screws 180 employed in connection with a TPLO procedure to install an implant device 100 of the disclosure is fabricated from the same implant grade alloy as used for the plate sections 10, 20 and the ligament 30. Further, various surface finishes and roughness levels of the epiphyseal tibial plate section 10, metaphyseal tibial plate section 20 and ligament 30 are acceptable, as deemed by those skilled in the field of the disclosure to be suitable for the application and manufacturing of the TPLO implant device 100. In an embodiment of the implant device 100, each of the epiphyseal tibial plate section 10, metaphyseal tibial plate section 20 and ligament 30 are manufactured such that their surfaces can have a matte finish (e.g., with a surface roughness from 20 to 60 m ($R_a$)).

Still referring to the TPLO implant device 100 of FIGS. 1A-1D, the epiphyseal tibial plate section 10 can be defined by an epiphyseal tibial plate section length 11 and width 13, and the metaphyseal tibial plate section 20 can be defined by a metaphyseal tibial plate section length 21 and width 23. Further, according to some implementations of the implant device 100, the width 13, 23 of each of the tibial plate sections 10, 20 is substantially uniform along the length 11, 21 of each of the respective tibial plate sections 10, 20. Consequently, in some embodiments, one or both of the plate sections 10, 20 can have one or more short, support protrusions 17, 27 (see FIG. 4, described further below); however, these short, support protrusions 17, 27 are limited in width 17a, 27a to no more than 100% of the width 13, 23 of the plate sections 10, 20. In some embodiments, the width 13, 23 of each of the tibial plate sections 10, 20 is both uniform and varies by no more than ±10%, 5%, 1%, 0.1%, 0.01%, or even less, as only limited by machining capability and the materials selected for the tibial plate sections 10, 20. Further, according to some embodiments of the implant device 100, each tibial plate section length 11, 21 is at least two times, three times, or four times longer than the respective tibial plate section width 13, 23.

According to embodiments of the TPLO implant device 100 shown in exemplary form in FIGS. 1A-1D, the aspect ratio of each of the tibial plate sections 10, 20 (i.e., ratio of length 11, 21 to width 13, 23, respectively) is at least 2:1, 2.5:1, 3:1, 3.5:1, 4:1, 5:1, and all aspect ratios between and greater than the foregoing aspect ratios. With regard to these embodiments, an implant device 100 with tibial plate sections 10, 20 having high aspect ratios of at least 2:1 ensures that the device is compact in size. Further, as noted earlier, the compact size of the implant device 100 can facilitate straightforward TPLO procedures with small incision sizes, short durations, and low infection risk. In addition, the compact size of the implant device 100 employing tibial plate sections 10, 20 with high aspect ratios (at least 2:1) also ensures that stresses can be uniformly distributed across the curvilinear cut 150, thus ensuring that the device 100 offers a stable securement of the proximal tibia following the osteotomy of the TPLO procedure.

Referring again to the TPLO implant device 100 depicted in FIGS. 1A-1D, according to some embodiments, the epiphyseal tibial plate section 10 can be configured such that its plate section length 11 is from 8 mm to 36 mm, and its width 13 is from 4 mm to 10 mm. In some implementations, the epiphyseal plate section length 11 can be 8 mm, 10 mm, 12 mm, 14 mm, 16 mm, 18 mm, 20 mm, 22 mm, 24 mm, 26 mm, 28 mm, 30 mm, 32 mm, 34 mm, 36 mm, or any length 11 between any of the foregoing length values. In some implementations, the epiphyseal plate section width 13 can be 4 mm, 5 mm, 6 mm, 7 mm, 8 mm, 9 mm, 10 mm, or any width 13 between any of the foregoing width values. For example, according to some embodiments, the length 11 of the epiphyseal tibial plate section 10 can be 2 times, 2.5 times, 3 times, 3.5 times, 4 times, 4.5 times, 5 times, or any factor between the foregoing, of its width 13. Unless otherwise noted, the plate section length 11 is defined as the longest dimension of the epiphyseal plate section 10 and the plate section width 13 is defined as the shorter dimension of the epiphyseal plate section 10 along its length 11.

Still referring to the TPLO implant device 100 depicted in FIGS. 1A-1D, according to some embodiments, the metaphyseal tibial plate section 20 can be configured such that its plate section length 21 is from 10 mm to 38 mm, and its width 23 is from 4 mm to 10 mm. In some implementations, the metaphyseal plate section length 21 can be 10 mm, 12 mm, 14 mm, 16 mm, 18 mm, 20 mm, 22 mm, 24 mm, 26 mm, 28 mm, 30 mm, 32 mm, 34 mm, 36 mm, 38 mm, or any length 21 between any of the foregoing length values. In some implementations, the metaphyseal plate section width 23 can be 4 mm, 5 mm, 6 mm, 7 mm, 8 mm, 9 mm, 10 mm, or any width 23 between any of the foregoing width values. For example, according to some embodiments, the length 21 of the metaphyseal tibial plate section 20 can be 2 times, 2.5 times, 3 times, 3.5 times, 4 times, 4.5 times, 5 times, or any factor between the foregoing, of its width 23. Further, according to some embodiments of the implant device 100, as shown in exemplary form in FIGS. 1A-1D, the ends of the metaphyseal tibial plate section 20 can have different lengths, with the proximal end longer than the distal end. In other embodiments, the ends of the metaphyseal tibial plate section 20 have substantially the same length. Further, unless otherwise noted, the plate section length 21 is defined as the longest dimension of the metaphyseal plate section 20 and the plate section width 23 is defined as the shorter dimension of the metaphyseal plate section 20 along its length 21.

Referring again to the TPLO implant device 100 depicted in FIGS. 1A-1D, according to some embodiments, the ligament 30 can be configured such that its length 31 is from 4 mm to 10 mm, 4 mm to 12 mm, 4 mm to 15 mm, 4 mm to 20 mm, 4 mm to 25 mm, 4 mm to 30 mm, and all ligament lengths 31 between the foregoing length ranges. Further, the ligament 30 can be configured such that its width 33 is from 4 mm to 10 mm, 4 mm to 8 mm, 4 mm to 6 mm, and all ligament widths 33 between the foregoing width ranges. As noted earlier, in some embodiments of the implant device 100, the ligament length 31 can be at least about 50% shorter than each of the tibial plate section lengths 11, 21, which, as also noted earlier, can range from 8 mm to 36 mm and 10 mm to 38 mm, respectively. For example, the ligament length 31 can be 50%, 55%, 60%, 70%, 80%, 90%, 95%, or even 100% shorter than each of the tibial plate section lengths 11, 21. These dimensional configurations of the ligament 30 can ensure that the surgeon is able to observe the curvilinear cut 150 beside and/or through the ligament 30, and properly orient the implant device 100 during the TPLO procedure.

According to implementations of the TPLO implant device 100 depicted in FIGS. 1A-1D, each of the epiphyseal tibial plate section 10, metaphyseal tibial plate section 20 and ligament 30 can be further defined by respective thicknesses 18, 28, and 38. In some embodiments, the thickness 18 of the epiphyseal tibial plate section 10 can range from 1 mm to 5 mm. For example, the thickness 18 can be 1 mm to 4 mm, 1.25 mm to 5 mm, 1.25 mm to 4 mm, 1.5 mm to 5 mm, 1.5 mm to 4 mm, and all thicknesses 18 between the foregoing thickness values. In some embodiments, the thickness 28 of the metaphyseal tibial plate section 20 can range from 1 mm to 5 mm. For example, the thickness 28 can be 1 mm to 4 mm, 1.25 mm to 5 mm, 1.25 mm to 4 mm, 1.5 mm to 5 mm, 1.5 mm to 4 mm, and all thicknesses 28 between the foregoing thickness values. Further, according to some embodiments, the thickness 38 of the ligament 30 can range from 1 mm to 5 mm. For example, the thickness 38 can be 1 mm to 4 mm, 1.25 mm to 5 mm, 1.25 mm to 4 mm, 1.5 mm to 5 mm, 1.5 mm to 4 mm, and all thicknesses 38 between the foregoing thickness values.

Referring again to the TPLO implant device 100 depicted in FIGS. 1A-1D, each of the epiphyseal and metaphyseal tibial plate sections 10, 20 can include at least two (2) screw holes 12, 22, respectively. In some embodiments, each of the epiphyseal and metaphyseal tibial plate sections 10, 20 can include from two (2) to ten (10), two (2) to eight (8), or two (2) to six (6) screw holes 12, 22, respectively, along with any number of screw holes 12, 22 between the foregoing ranges. For example, each of the epiphyseal and metaphyseal tibial plate sections 10, 20 can include 2, 3, 4, 5, 6, 7, 8, 9, or even 10 screw holes 12, 22, respectively. Further, according to some implementations of the implant device 100, one of the screw holes 12 of the epiphyseal tibial plate section 10 can be a single elongated screw hole 12a (e.g., the proximal-most screw hole) that is elongated in a direction perpendicular to a curvilinear cut 150 of the tibial bone to receive a round screw 180, as shown in exemplary form in FIGS. 1A-1D. According to embodiments, each of the screw holes 12, 22 comprises a round shape suitable to receive a screw 180, which also comprises a round shaped head. In some embodiments, each of the plate sections 10, 20 has the same number of screw holes 12, 12a, and 22, respectively. In other embodiments, particularly those in which the metaphyseal tibial plate section length 21 is longer than the epiphyseal plate section length 11, the number of screw holes 22 in the metaphyseal tibial plate section 20 is greater than the number of screw holes 12 in the epiphyseal tibial plate section 10. In general, the spacing and arrangement of the screw holes 12, 12a, and 22, respectively, in the plate sections 10, 20 can be equal or differ, as determined by the shape of the plate sections 10, 20 and engineering and plate machining considerations understood by those skilled in the field of the disclosure. In embodiments, each of the screw holes 12, 12a and 22 are distributed within the plate sections 10, 20 such that none are located on the axis parallel to the direction of the width 33 of the ligament 30, as shown in exemplary form in the implant device 100 of FIGS. 1A-1D.

Figure 1D:
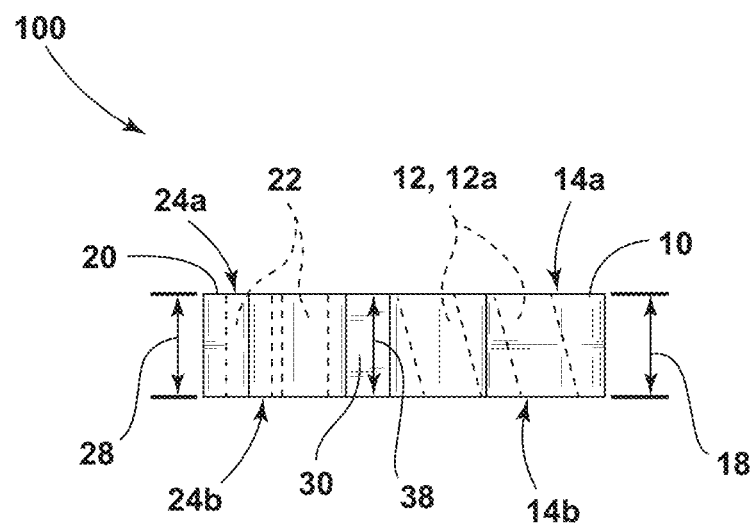
FIG. 1D is an end-on view of the implant device of FIG. 1A along an axis parallel to the length of its epiphyseal and metaphyseal tibial plate sections.
Figure 2A:
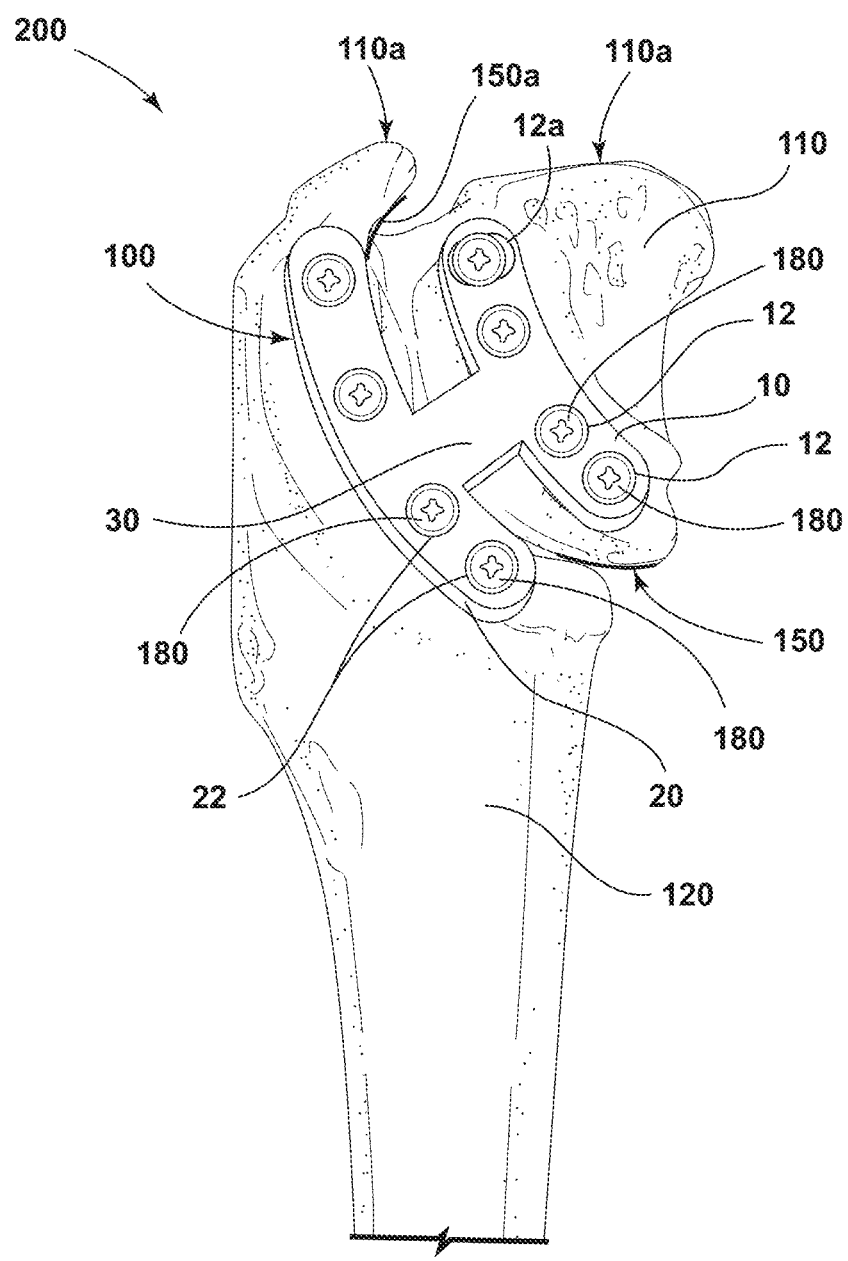
FIG. 2A is a perspective front view of an implant assembly comprising the implant device of FIG. 1A, as secured to epiphyseal and metaphyseal tibial bone fragments across a curvilinear tibial cut, according to an embodiment of the disclosure.
Figure 2B:
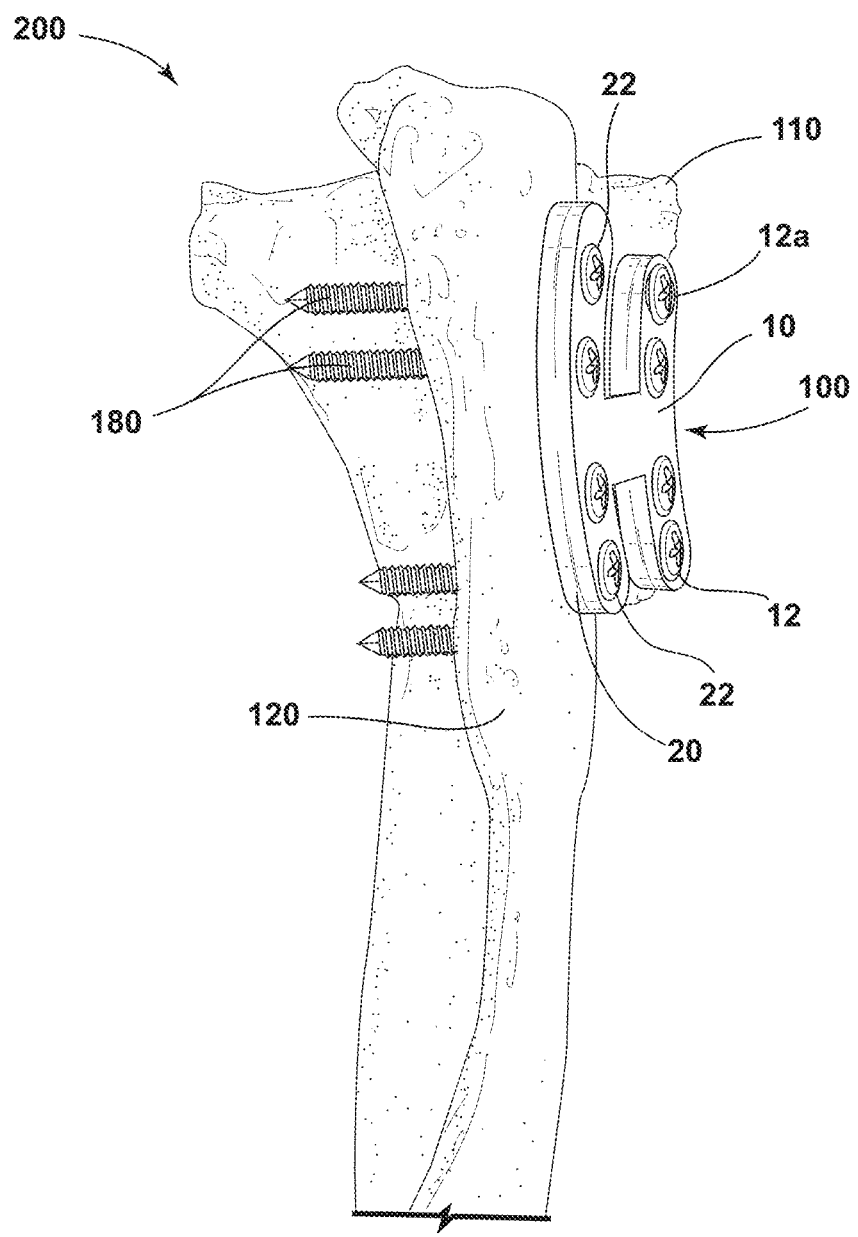
FIG. 2B is a 90° counterclockwise-rotated perspective view of the implant assembly of FIG. 2A.
Figure 2C:
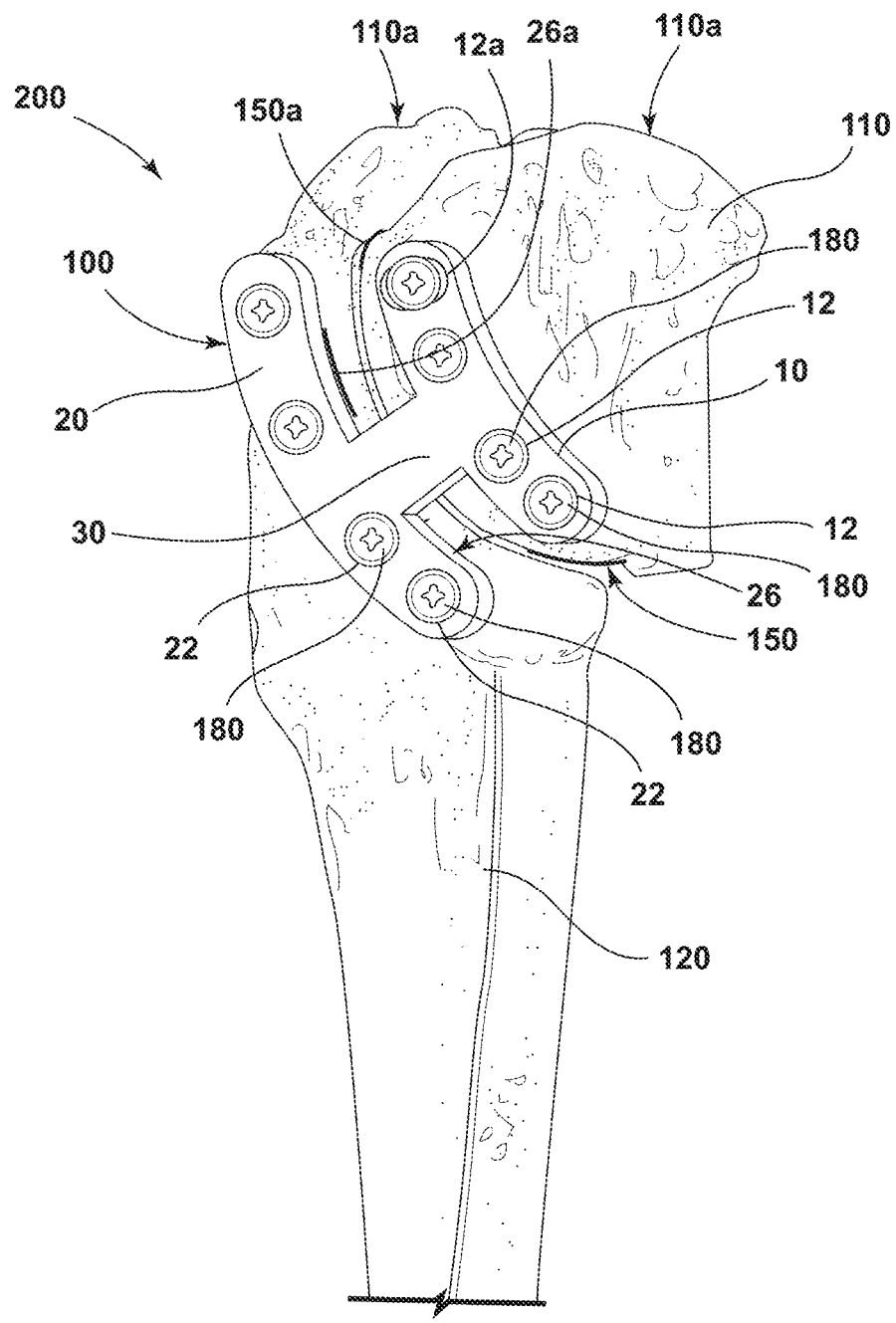
FIG. 2C is a ~10° clockwise-rotated perspective view of the implant assembly of FIG. 2A.

Still referring to FIGS. 1A-1D, the TPLO implant device 100 can be configured such that each of the tibial plate sections 10, 20 comprises a cut-adjacent curvilinear surface 16, 26 that is substantially normal to its bone-contacting surface 14b, 24b (and normal to its exterior surface 14a, 24a), the cut-adjacent curvilinear surface 16, 26 comprising a plate radius 16a, 26a within ±25% of the curvilinear cut radius 150a of the curvilinear cut 150 (see FIGS. 2A-2C, described in further detail below). In embodiments, the plate radius 16a, 26a of the cut-adjacent curvilinear surface 16, 26 of the epiphyseal and metaphyseal tibial plate sections 10, 20 are within ±25%, 20%, 15%, 10%, 5%, or even 1% of the curvilinear cut radius 150a. In embodiments, the plate radius 16a, 26a of the cut-adjacent curvilinear surface 16, 26 can range from 10 mm to 30 mm, e.g., 10 mm, 12 mm, 14 mm, 16 mm, 18 mm, 20 mm, 22 mm, 24 mm, 26 mm, 28 mm, 30 mm, or any radius value between the foregoing. According to some implementations, the plate radius 16a of the epiphyseal tibial plate section 10 and the plate radius 26a of the metaphyseal tibial plate section 20 differ by no more than ±10%, ±5%, or even ±1%. In general, the foregoing configurations relate to shapes of the epiphyseal and metaphyseal tibial plate sections 10, 20 with cut-adjacent curvilinear surfaces 16, 26 that generally match the shape of the curvilinear cut 150, including its radius 150a, to ensure a uniform distribution of stress and an optimal reinforcement between the epiphyseal and metaphyseal tibial fragments 110, 120.

Referring again to the TPLO implant device 100 depicted in exemplary form in FIGS. 1A-1D, it should be understood that the curvilinear cut 150 of the tibia bone (i.e., as secured by the device 100) is defined by a curvilinear cut radius 150a and separates the epiphyseal and metaphyseal tibial bone fragments 110, 120 (see FIGS. 2A-2C, described in further detail below). In general, the practitioner of a TPLO procedure can use an appropriate power tool, as understood by those skilled in the field of the disclosure (e.g., a deSoutter MBQ-708 Vdrive drill, as procured from Movora (a veterinary component supplier)), to make a curvilinear cut to the tibia to form a cut radius 150a that ranges from 5 mm to 35 mm. More particularly, the TPLO practitioner uses a saw blade with a sawblade number that corresponds to the desired cut radius 150a (e.g., TPLO Saw Blade Nos. 8-30, as procured from Morova (a veterinary component supplier), that correspond to cut radii 8-30 mm, respectively) to form the cut 150. For example, the curvilinear cut radius 150a of the curvilinear cut 150 can be 8 mm, 10 mm, 12 mm, 15 mm, 18 mm, 20 mm, 24 mm, 27 mm, or 30 mm.

According to another embodiment, a TPLO implant device 100 for a TPLO procedure is depicted in exemplary form in FIGS. 1A-1D. The implant device 100 according to this embodiment includes an epiphyseal tibial plate section 10 with at least two screw holes 12, an exterior surface 14a, and a bone-contacting surface 14b, each screw hole 12 of the epiphyseal tibial plate section 10 configured to accept bone screws 180 to secure the plate section 10 to an epiphyseal tibial bone fragment 110. The implant device 100 further includes a metaphyseal tibial plate section 20 with at least two screw holes 22, an exterior surface 24a, and a bone-contacting surface 24b, each screw hole 22 of the metaphyseal tibial plate section 20 configured to accept a bone screw 180 to secure the plate section 20 to a metaphyseal tibial bone fragment 120.

The implant device 100 (see FIGS. 1A-1D) of this embodiment further includes a ligament 30 configured to join the tibial plate sections 10, 20 and to span a curvilinear tibial cut 150. The curvilinear cut 150 comprises a curvilinear cut radius 150a and separates the epiphyseal and metaphyseal tibial fragments 110, 120. Each of the epiphyseal and metaphyseal tibial plate sections 10, 20 and the ligament 30 is made from an implant grade alloy. Further, the epiphyseal tibial plate section 10 comprises an epiphyseal tibial plate section length 11 and width 13, the metaphyseal tibial plate section 20 comprises a metaphyseal tibial plate section length 21 and width 23, and each tibial plate section length 11, 21 is at least two times longer than the respective tibial plate section width 13, 23. The width 13, 23 of each of the plate sections 10, 20 is substantially uniform along the length 11, 21 of each of the respective tibial plate sections 10, 20. In addition, the epiphyseal tibial plate section length 11 is shorter than the metaphyseal tibial plate section length 21.

According to another embodiment, a TPLO implant device 100 for a TPLO procedure is depicted in exemplary form in FIGS. 1A-1D. The implant device 100 according to this embodiment consists essentially of an epiphyseal tibial plate section 10, a metaphyseal tibial plate section 20, and a ligament 30 configured to join the tibial plate sections 10, 20. As such, the implant device 100 of this embodiment does not contain any additional features which could materially affect its characteristics (e.g., an additional spacer in the curvilinear cut 150, any flanges, brackets or similar features normal to the plate sections 10, 20 for positioning the device 100 within the curvilinear cut 150, and/or any appendages or protrusions extending from the plate sections 10, 20 away from the curvilinear cut 150 more than 100% of the widths 13, 23 of these plate sections). Further, in this embodiment of the implant device 100, the epiphyseal tibial plate section 10 has at least two screw holes 12 (including one elongated screw hole 12a), an exterior surface 14a, and a bone-contacting surface 14b, each screw hole 12 of the epiphyseal tibial plate section 10 configured to accept a bone screw 180 to secure the plate section 10 to an epiphyseal tibial bone fragment 110. The metaphyseal tibial plate section 20 has at least two screw holes 22, an exterior surface 24a, and a bone-contacting surface 24b, each screw hole 22 of the metaphyseal tibial plate section 20 configured to accept a bone screw 180 to secure the plate section 20 to a metaphyseal tibial bone fragment 120. In addition, the ligament 30 is configured to span a curvilinear tibial cut 150. The curvilinear cut 150 comprises a curvilinear cut radius 150a and separates the epiphyseal and metaphyseal tibial fragments 110, 120. Each of the epiphyseal and metaphyseal tibial plate sections 10, 20 and the ligament 30 is made from an implant grade alloy. Further, the epiphyseal tibial plate section 10 comprises an epiphyseal tibial plate section length 11 and width 13, the metaphyseal tibial plate section 20 comprises a metaphyseal tibial plate section length 21 and width 23, and each tibial plate section length 11, 21 is at least two times longer than the respective tibial plate section width 13, 23. The width 13, 23 of each of the plate sections 10, 20 is substantially uniform along the length 11, 21 of each of the respective tibial plate sections 10, 20.

Referring now to FIG. 1D, an end-on view of the plate sections 10, 20 of the implant device 100 of FIG. 1A is provided, as viewed along an axis parallel to the length 11, 21 of its epiphyseal and metaphyseal tibial plate sections 10, 20 and showing the screw holes 12, 22. The screw holes 12, 22 (and any elongated hole 12a, if present) run through the plate sections 10, 20 from the exterior surface 14a, 24a to the bone-contacting surface 14b, 24b. According to implementations of the implant device 100, the holes 12, 22 of the epiphyseal and metaphyseal tibial plate sections 10, 20 are round. Further, the holes 12, 12a and 22 of the plate sections 10, 20, respectively, can have countersink, beveled edges in proximity to the exterior surfaces 14a, 24a. According to some embodiments of the implant device 100, each of the holes 12, 12a, and 22 can be configured to accommodate screws 180, which are locking or non-locking in their configuration. Further, according to implementations of the implant device 100, the screw holes 12, 12a, and 22 can have a diameter that ranges from 1.5 mm to 3.5 mm (or the longest width dimension for elongated holes 12a), including any diameter value between the foregoing, and as capable of securing screws 180 with various diameters within this range. As is evident from this figure, the screw holes 22 of the metaphyseal tibial plate section 20 are oriented in the same direction as the thickness 28 and parallel to the cut-adjacent curvilinear surface 16. As is also evident from this figure, the screw holes 12 (and elongated hole 12a, if present) of the epiphyseal tibial plate section 10 can be oriented generally in the direction of the thickness 18 and generally parallel to the cut-adjacent curvilinear surface 26, but with an offset of about 5-15° away from the curvilinear cut 150 in the caudal direction (see FIGS. 2A-2C). For example, the screw holes 12 (and elongated hole 12a, if present) can be offset 5°, 10°, 15°, or all angles between the foregoing, away from the curvilinear cut 150 in the caudal direction (see FIGS. 2A-2C).

Referring now to FIGS. 2A-2C, an implant assembly 200 is shown in various perspective views. The implant assembly 200 includes a TPLO implant device 100 configured according to principles of the disclosure (see FIGS. 1A-1D and corresponding description above), as secured to epiphyseal and metaphyseal tibial bone fragments 110, 120 across a curvilinear tibial cut 150. As is evident from these figures, the implant device 100 is installed by a practitioner during a TPLO procedure. Notably, the practitioner installs the implant device 100 after the curvilinear cut 150 is made to separate the epiphyseal and metaphyseal tibial bone fragments 110, 120 (e.g., as using Saw Blade Nos. 8-30 from Movora), and the epiphyseal tibial bone fragment 110 has been rotated in a clockwise direction for the left leg and in a counterclockwise direction for the right leg along the curvilinear cut 150 to level the tibial bone plateau 110a. Once the tibial bone plateau 110a has been leveled by the practitioner, the implant device 100 is affixed to the epiphyseal and metaphyseal tibial bone fragments 110, 120 by bone screws 180, as inserted through holes 12, 22, and any elongated hole 12a, if present. For embodiments of the implant device 100 (see FIGS. 2A-2C) that comprise an elongated hole 12a in the epiphyseal tibial plate section 10, the screw 180 used in this hole is adjusted by the practitioner within the hole relative to the curvilinear cut 150 to increase the compressive forces between the tibial bone fragments 110, 120. As is also evident from the figures, the implant device 100 is installed such that the ligament 30 spans the curvilinear cut 150 and the cut-adjacent curvilinear surfaces 16, 26 of the epiphyseal and metaphyseal tibial plate sections 10, 20 are aligned along the curvilinear cut 150.

Figure 3:
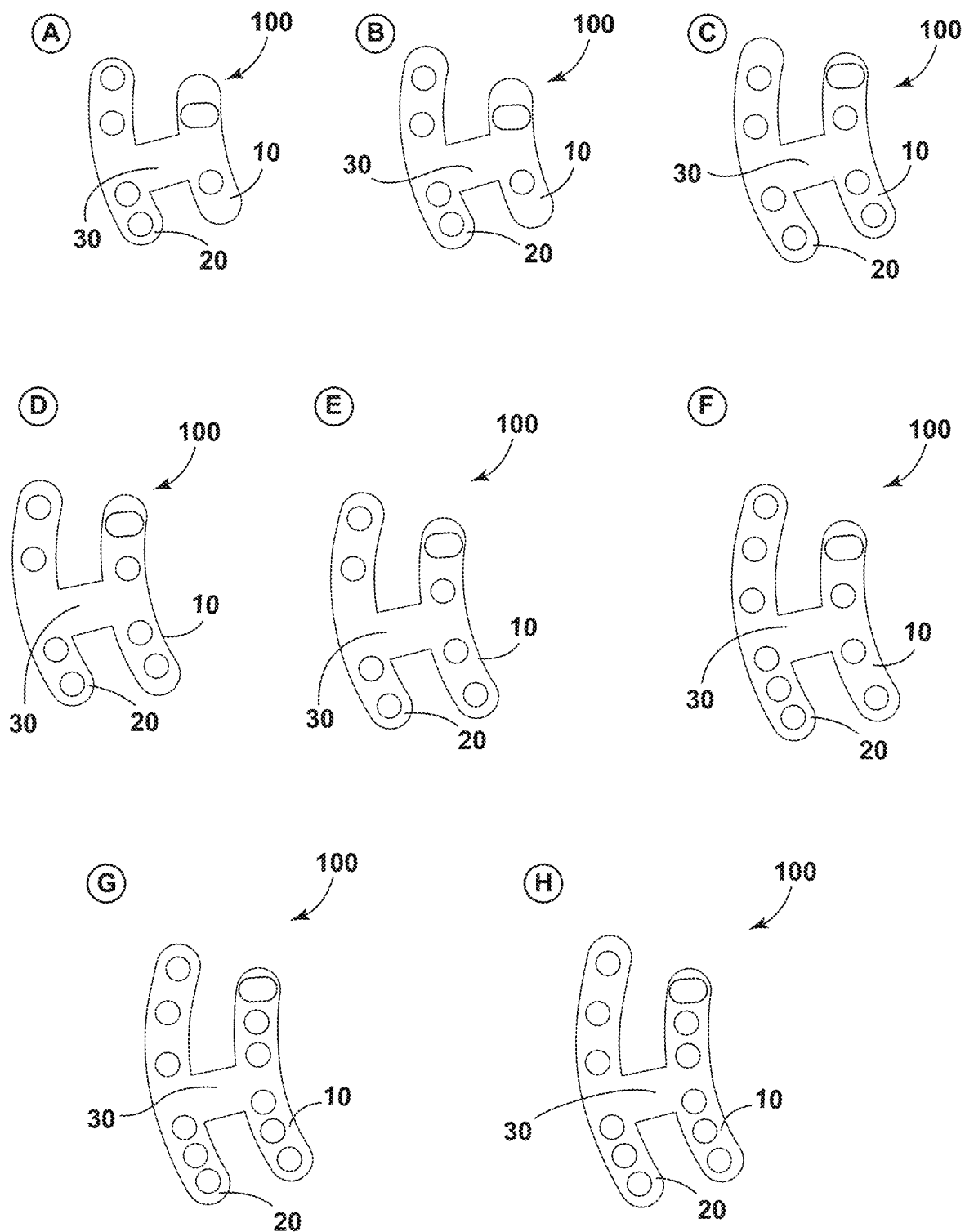
FIG. 3 is a top plan view of eight (8) implant devices of varying sizes and bone screw hole configurations for animals of various sizes, according to embodiments of the disclosure.

Referring now to FIG. 3, a top plan view is provided of eight (8) TPLO implant device 100 embodiments with epiphyseal and metaphyseal tibial plate sections 10, 20 having varying sizes and bone screw hole 12, 12a, and 22 configurations for animals of various sizes (labeled "A" through "H"). As is evident from the figure, implant devices 100 with particular screw hole 12, 12a, and 22 and epiphyseal and metaphyseal plate section length 11, 21 (see FIGS. 1A-1D) configurations set forth below in Table 1 are depicted. It should be recognized that the implant device 100 configurations in FIG. 3 and Table 1 below are merely illustrative. In addition, it should be recognized that the implant device 100 configurations shown in FIG. 3 are not necessarily to scale. In general, the implant devices 100 labeled "A" through "H" in FIG. 3 successively increase in size, and are indicative of implant devices that can be selected by a practitioner to accommodate canines with different sizes. Other configurations of the implant device 100 are also consistent with the principles outlined earlier in this disclosure (e.g., an epiphyseal tibial plate section 10 with three (3) screw holes 12 and a metaphyseal tibial plate section 20 with five (5) screw holes 22, an epiphyseal tibial plate section 10 with four (4) screw holes 12 and a metaphyseal tibial plate section 20 with four (4) screw holes 22, etc.).

TABLE 1

Illustrative TPLO implant device configurations

| TPLO implant device (See FIG. 3) | # of epiphyseal tibial plate section screw holes | epiphyseal tibial plate section length (mm) | # of metaphyseal tibial plate section screw holes | metaphyseal tibial plate section length (mm) |
| --- | --- | --- | --- | --- |
| A | 2 | 8 | 4 | 10 |
| B | 2 | 13 | 4 | 15 |
| C | 4 | 17 | 4 | 19 |
| D | 4 | 19 | 4 | 21 |
| E | 4 | 20 | 4 | 22 |
| F | 4 | 25 | 6 | 27 |
| G | 6 | 26 | 6 | 28 |
| H | 6 | 30 | 6 | 32 |

Figure 4:
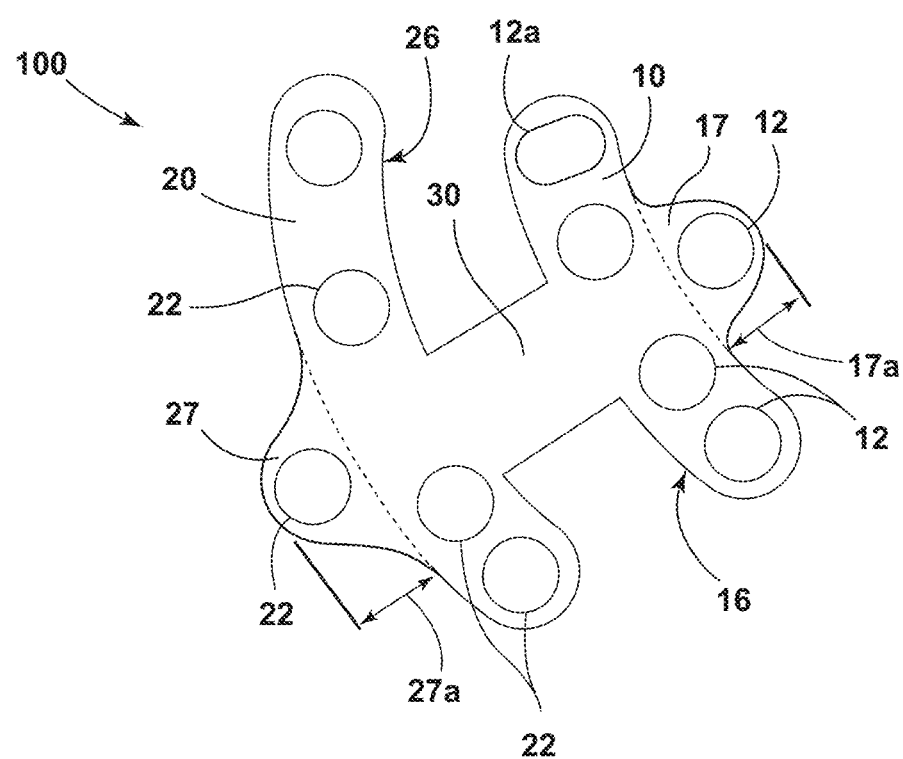
FIG. 4 is a top plan view of an osteotomy implant device with epiphyseal and metaphyseal tibial plate sections and a ligament, according to another embodiment of the disclosure.

Referring now to FIG. 4, a top plan view is provided of a TPLO implant device 100 with epiphyseal and metaphyseal tibial plate sections 10, 20 and a ligament 30. Notably, each plate section 10, 20 of the implant device 100 shown in FIG. 4 can include one or more short, support protrusions 17, 27, as shown in exemplary form. As mentioned earlier, in some embodiments of the implant device 100 (see also FIGS. 1A-1D), one or both of the plate sections 10, 20 can have one or more short, support protrusions 17, 27. In some implementations, each of the short, support protrusions 17, 27 comprises a screw hole 12, 22, respectively, and emanates from a surface of the plate sections 10, 20 opposite to the cut-adjacent curvilinear surface 16, 26. In general, these support protrusion(s) 17, 27 are limited in width 17a, 27a to no more than 100% of the width 13, 23 (see FIG. 1B) of the plate sections 10, 20. For example, the support protrusion(s) 17, 27 can have a width 17a, 27a, respectively, of 100%, 95%, 90%, 85%, 80%, 75%, 70%, 65%, 60%, 55%, 50%, 45%, 40%, 35%, 30%, or even 25% of the width 13, 23 (see FIG. 1B) of the plate sections 10, 20, respectively. As such, the support protrusion(s) 17 extends only to a limited degree along the epiphyseal tibial bone fragment 110 toward the tibial plateau 110a (see FIGS. 2A-2C). Similarly, the support protrusion(s) 27 extends only to a limited degree away from the curvilinear cut 150 along the metaphyseal tibial bone fragment 120. Consequently, even if one or more short, support protrusion(s) 17, 27 are present in the implant device 100 according to this embodiment, the implant device 100 remains compact and only a small incision site is needed as part of the TPLO procedure.

Aspect 1. An implant device for a tibial plateau leveling osteotomy is provided that includes: an epiphyseal tibial plate section comprising at least two screw holes and a bone-contacting surface, each screw hole of the epiphyseal tibial plate section configured to secure a bone screw to secure the plate section to an epiphyseal tibial bone fragment; a metaphyseal tibial plate section comprising at least two screw holes and a bone-contacting surface, each screw hole of the metaphyseal tibial plate section configured to accept a bone screw to secure the plate section to an metaphyseal tibial bone fragment; and a ligament configured to join the tibial plates and span a curvilinear tibial cut, wherein the curvilinear cut comprises a curvilinear cut radius and separates the epiphyseal and metaphyseal tibial bone fragments. Each of the metaphyseal and epiphyseal tibial plate sections and the ligament comprises an implant grade alloy. The epiphyseal tibial plate section comprises an epiphyseal tibial plate length and width, the metaphyseal tibial plate section comprises a metaphyseal tibial plate length and width, and each tibial plate length is at least two times longer than the respective tibial plate width. The width of each of the tibial plate sections is substantially uniform along the length of each of the respective tibial plate sections. Further, each of the tibial plate sections comprises a cut-adjacent curvilinear surface that is substantially normal to its bone-contacting surface, the curvilinear surface comprising a plate radius within ±25% of the curvilinear cut radius.

Aspect 2. The implant device of Aspect 1, wherein the cut-adjacent curvilinear surface of each plate comprises a plate radius within 10% of the cut radius.

Aspect 3. The implant device of Aspect 1, wherein each of the tibial plate sections comprises two (2) to eight (8) screw holes and a curvilinear shape.

Aspect 4. The implant device of Aspect 1, wherein the ligament comprises a ligament length defined along an axis substantially parallel to an axis defined by each of the epiphyseal and metaphyseal tibial plate lengths, the ligament length is at least 50% shorter than each of the epiphyseal and metaphyseal tibial plate lengths.

Aspect 5. The implant device of Aspect 4, wherein the ligament further comprises a ligament width from 4 mm to 10 mm and a ligament length from 4 mm to 12 mm, and further wherein each of the plate sections and the ligament comprises a thickness from 1.5 mm to 4 mm.

Aspect 6. The implant device of Aspect 1, wherein the width of each of the tibial plate sections along the length of each of the respective tibial plate sections is both uniform and varies by no more than +5%.

Aspect 7. The implant device of Aspect 1, wherein the epiphyseal tibial plate section length is from 8 mm to 36 mm, the epiphyseal tibial plate section width is from 4 mm to 10 mm, the metaphyseal tibial plate section length is from 10 mm to 38 mm, and the epiphyseal tibial plate section width is from 4 mm to 10 mm.

Aspect 8. The implant device of Aspect 1, wherein the plate radius of each of the curvilinear surfaces of the epiphyseal and metaphyseal tibial plate section is from 10 mm to 30 mm, and further wherein the plate radii of the curvilinear surfaces of the tibial plate sections are within 5% of one another.

Aspect 9. The implant device of Aspect 1, wherein one of the at least two screw holes of the epiphyseal plate section is elongated in a direction perpendicular to the curvilinear tibial cut.

Aspect 10. An implant device for a tibial plateau leveling osteotomy is provided that includes: an epiphyseal tibial plate section comprising at least two screw holes and a bone-contacting surface, each screw hole of the epiphyseal tibial plate section configured to accept a bone screw to secure the plate section to an epiphyseal tibial bone fragment; a metaphyseal tibial plate section comprising at least two screw holes and a bone-contacting surface, each screw hole of the metaphyseal tibial plate section configured to accept a bone screw to secure the plate section to a metaphyseal tibial bone fragment; and a ligament configured to join the tibial plate sections and to span a curvilinear tibial cut, wherein the curvilinear cut comprises a curvilinear cut radius and separates the epiphyseal and metaphyseal tibial fragments. Each of the epiphyseal and metaphyseal tibial plate sections and the ligament comprises an implant grade alloy. Further, the epiphyseal tibial plate section comprises an epiphyseal tibial plate section length and width, the metaphyseal tibial plate section comprises a metaphyseal tibial plate section length and width, and each tibial plate section length is at least two times longer than the respective tibial plate section width. The width of each of the plate sections is substantially uniform along the length of each of the respective tibial plate sections. In addition, the epiphyseal tibial plate section length is shorter than the metaphyseal tibial plate section length.

Aspect 11. The implant device of Aspect 10, wherein each of the tibial plate sections comprises two (2) to eight (8) screw holes and a curvilinear shape.

Aspect 12. The implant device of Aspect 10, wherein the ligament comprises a ligament length defined along an axis substantially parallel to an axis defined by each of the epiphyseal and metaphyseal tibial plate section lengths, the ligament length is at least 50% shorter than each of the epiphyseal and metaphyseal tibial plate section lengths.

Aspect 13. The implant device of Aspect 12, wherein the ligament further comprises a ligament width from 4 mm to 10 mm and a ligament length from 4 mm to 12 mm, and further wherein each of the plate sections and the ligament comprises a thickness from 1.5 mm to 4 mm.

Aspect 14. The implant device of Aspect 10, wherein the width of each of the tibial plate sections along the length of each of the respective tibial plate sections is both uniform and varies by no more than ±5%.

Aspect 15. The implant device of Aspect 10, wherein the epiphyseal tibial plate section length is from 8 mm to 36 mm, the epiphyseal tibial plate section width is from 4 mm to 10 mm, the metaphyseal tibial plate section length is from 10 mm to 38 mm, and the metaphyseal tibial plate section width is from 4 mm to 10 mm.

Aspect 16. The implant device of Aspect 10, wherein each of the tibial plate sections comprises a cut-adjacent curvilinear surface that is substantially normal to its bone-contacting surface, the curvilinear surface comprising a plate radius within ±25% of the curvilinear cut radius.

Aspect 17. The implant device of Aspect 10, wherein one of the at least two screw holes of the epiphyseal plate section is elongated in a direction perpendicular to the curvilinear tibial cut.

Aspect 18. An implant device for a tibial plateau leveling osteotomy is provided that consists essentially of: an epiphyseal tibial plate section comprising at least two screw holes and a bone-contacting surface, each screw hole of the epiphyseal tibial plate section configured to accept a bone screw to secure the plate section to an epiphyseal tibial bone fragment; a metaphyseal tibial plate section comprising at least two screw holes and a bone-contacting surface, each screw hole of the metaphyseal tibial plate section configured to accept a bone screw to secure the plate section to a metaphyseal tibial bone fragment; and a ligament configured to join the tibial plates and to span a curvilinear tibial cut, wherein the curvilinear cut comprises a curvilinear cut radius and is separates the epiphyseal and metaphyseal tibial fragments. Each of the epiphyseal and metaphyseal tibial plate sections and the ligament comprises an implant grade alloy. Further, the epiphyseal tibial plate section comprises an epiphyseal tibial plate section length and width, the metaphyseal tibial plate section comprises a metaphyseal tibial plate section length and width, and each tibial plate section length is at least two times longer than the respective tibial plate width. In addition, the width of each of the plate sections is substantially uniform along the length of each of the respective tibial plate sections.

Aspect 19. The implant device of Aspect 18, wherein each of the tibial plate sections comprises two (2) to eight (8) screw holes and a curvilinear shape.

Aspect 20. The implant device of Aspect 18, wherein the ligament comprises a ligament length defined along an axis substantially parallel to an axis defined by each of the epiphyseal and metaphyseal tibial plate section lengths, the ligament length is at least 50% shorter than each of the epiphyseal and metaphyseal tibial plate section lengths, and further wherein the ligament comprises a ligament width, the ligament width is from 4 mm to 10 mm, and the ligament length is from 4 mm to 12 mm.

Aspect 21. The implant device of Aspect 18, wherein each of the plate sections and the ligament comprises a thickness from 1.5 mm to 4 mm, and further wherein the epiphyseal tibial plate section length is from 8 mm to 36 mm, the epiphyseal tibial plate section width is from 4 mm to 10 mm, the metaphyseal tibial plate section length is from 10 mm to 38 mm, and the metaphyseal tibial plate section width is from 4 mm to 10 mm.

Aspect 22. The implant device of Aspect 18, wherein each of the tibial plate sections comprises a cut-adjacent curvilinear surface that is substantially normal to its bone-contacting surface, the curvilinear surface comprising a plate radius within ±25% of the curvilinear cut radius, and further wherein the epiphyseal tibial plate section length is shorter than the metaphyseal tibial plate length.

Aspect 23. The implant device of Aspect 18, wherein one of the at least two screw holes of the epiphyseal plate section is elongated in a direction perpendicular to the curvilinear tibial cut.

Aspect 24. An implant device for a tibial plateau leveling osteotomy is provided that includes: an epiphyseal tibial plate section comprising at least two screw holes and a bone-contacting surface, each screw hole of the epiphyseal tibial plate section configured to accept a bone screw to secure the plate section to an epiphyseal tibial bone fragment; a metaphyseal tibial plate section comprising at least two screw holes and a bone-contacting surface, each screw hole of the metaphyseal tibial plate section configured to accept a bone screw to secure the plate section to a metaphyseal tibial bone fragment; and a ligament configured to join the tibial plates and to span a curvilinear tibial cut, wherein the curvilinear cut comprises a curvilinear cut radius and is separates the epiphyseal and metaphyseal tibial fragments. Each of the epiphyseal and metaphyseal tibial plate sections and the ligament comprises an implant grade alloy. Further, the epiphyseal tibial plate section comprises an epiphyseal tibial plate section length and width, the metaphyseal tibial plate section comprises a metaphyseal tibial plate section length and width, and each tibial plate section length is at least two times longer than the respective tibial plate width. In addition, the width of each of the plate sections is substantially uniform along the length of each of the respective tibial plate sections. Further, one or both of the tibial plate sections comprises a support protrusion, the support protrusion comprising a screw hole and emanating from a surface of the plate section opposite to a cut-adjacent curvilinear surface of the plate section that is substantially normal to its bone-contacting surface.

Aspect 25. The implant device of Aspect 24, wherein each support protrusion comprises a width that is no more than 100% of the width of the respective plate section.

Aspect 26. The implant device of Aspect 24, wherein each of the tibial plate sections comprises two (2) to eight (8) screw holes and a curvilinear shape.

Aspect 27. The implant device of Aspect 24, wherein the ligament comprises a ligament length defined along an axis substantially parallel to an axis defined by each of the epiphyseal and metaphyseal tibial plate section lengths, the ligament length is at least 50% shorter than each of the epiphyseal and metaphyseal tibial plate section lengths, and further wherein the ligament comprises a ligament width, the ligament width is from 4 mm to 10 mm, and the ligament length is from 4 mm to 12 mm.

Aspect 28. The implant device of Aspect 24, wherein each of the plate sections and the ligament comprises a thickness from 1.5 mm to 4 mm, and further wherein the epiphyseal tibial plate section length is from 8 mm to 36 mm, the epiphyseal tibial plate section width is from 4 mm to 10 mm, the metaphyseal tibial plate section length is from 10 mm to 38 mm, and the metaphyseal tibial plate section width is from 4 mm to 10 mm.

Aspect 29. The implant device of Aspect 24, wherein each of the tibial plate sections comprises a cut-adjacent curvilinear surface that is substantially normal to its bone-contacting surface, the curvilinear surface comprising a plate radius within ±25% of the curvilinear cut radius, and further wherein the epiphyseal tibial plate section length is shorter than the metaphyseal tibial plate length.

Aspect 30. The implant device of Aspect 24, wherein one of the at least two screw holes of the epiphyseal plate section is elongated in a direction perpendicular to the curvilinear tibial cut.

Although multiple embodiments of the TPLO implant device of the present disclosure have been illustrated in the accompanying Drawings and described in the foregoing Detailed Description, it should be understood that the present disclosure is not limited to the disclosed embodiments. Rather, the osteotomy implant device is also capable of numerous rearrangements (e.g., implant devices with epiphyseal and metaphyseal tibial plate sections having multiple sections, some or all in a curvilinear shape; implant devices with ligaments formed in a mesh to join the tibial plate sections while retaining visibility to the curvilinear cut below, etc.), modifications, and/or substitutions without departing from the present disclosure that has been set forth and defined within the following claims.

What is claimed is:

1. An implant device for a tibial plateau leveling osteotomy, comprising:
   an epiphyseal tibial plate section comprising at least two screw holes and a bone-contacting surface, each screw hole of the epiphyseal tibial plate section configured to accept a bone screw to secure the plate section to an epiphyseal tibial bone fragment;
   a metaphyseal tibial plate section comprising at least two screw holes and a bone-contacting surface, each screw hole of the metaphyseal tibial plate section configured to accept a bone screw to secure the plate section to a metaphyseal tibial bone fragment; and
   a ligament configured to join the tibial plate sections and span a curvilinear tibial cut, wherein the curvilinear cut comprises a curvilinear cut radius and separates the epiphyseal and metaphyseal tibial bone fragments,
   wherein each of the metaphyseal and epiphyseal tibial plate sections and the ligament comprises an implant grade alloy,
   wherein the epiphyseal tibial plate section comprises an epiphyseal tibial plate length and width, the metaphyseal tibial plate comprises a metaphyseal tibial plate length and width, and each tibial plate section length is at least two times longer than the respective tibial plate width,
   wherein the width of each of the tibial plate sections is substantially uniform along the length of each of the respective tibial plate sections,
   wherein each of the tibial plate sections comprises a cut-adjacent curvilinear surface that is substantially normal to its bone-contacting surface, the curvilinear surface comprising a plate radius within ±25% of the curvilinear cut radius, and
   further wherein each of the cut-adjacent curvilinear surfaces generally matches a shape of the curvilinear cut and is curved in the same direction as the other cut-adjacent curvilinear surface for alignment along the curvilinear cut.

2. The implant device of claim 1, wherein the cut-adjacent curvilinear surface of each plate section comprises a plate radius within 10% of the cut radius.

3. The implant device of claim 1, wherein each of the tibial plate sections comprises two (2) to eight (8) screw holes and a curvilinear shape.

4. The implant device of claim 1, wherein the ligament comprises a ligament length defined along an axis substantially parallel to an axis defined by each of the epiphyseal and metaphyseal tibial plate lengths, the ligament length is at least 50% shorter than each of the epiphyseal and metaphyseal tibial plate lengths.

5. The implant device of claim 4, wherein the ligament further comprises a ligament width from 4 mm to 10 mm and a ligament length from 4 mm to 12 mm, and further wherein each of the plate sections and the ligament comprises a thickness from 1.5 mm to 4 mm.

6. The implant device of claim 1, wherein the width of each of the tibial plate sections along the length of each of the respective tibial plate sections is both uniform and varies by no more than ±5%.

7. The implant device of claim 1, wherein the epiphyseal tibial plate section length is from 8 mm to 36 mm, the epiphyseal tibial plate section width is from 4 mm to 10 mm, the metaphyseal tibial plate section length is from 10 mm to 38 mm, and the metaphyseal tibial plate section width is from 4 mm to 10 mm.

8. The implant device of claim 1, wherein the plate radius of each of the curvilinear surfaces of the epiphyseal and metaphyseal tibial plates is from 10 mm to 30 mm, and further wherein the plate radii of the curvilinear surfaces of the tibial plate sections are within 5% of one another.

9. The implant device of claim 1, wherein one of the at least two screw holes of the epiphyseal plate section is elongated in a direction perpendicular to the curvilinear tibial cut.

10. An implant device for a tibial plateau leveling osteotomy, comprising:
- an epiphyseal tibial plate section comprising at least two screw holes and a bone-contacting surface, each screw hole of the epiphyseal tibial plate section configured to accept a bone screw to secure the plate section to an epiphyseal tibial bone fragment;
- a metaphyseal tibial plate section comprising at least two screw holes and a bone-contacting surface, each screw hole of the metaphyseal tibial plate section configured to accept a bone screw to secure the plate section to a metaphyseal tibial bone fragment; and
- a ligament configured to join the tibial plate sections and to span a curvilinear tibial cut, wherein the curvilinear cut comprises a curvilinear cut radius and separates the epiphyseal and metaphyseal tibial fragments,
- wherein each of the epiphyseal and metaphyseal tibial plate sections and the ligament comprises an implant grade alloy,
- wherein the epiphyseal tibial plate section comprises an epiphyseal tibial plate section length and width, the metaphyseal tibial plate section comprises a metaphyseal tibial plate section length and width, and each tibial plate section length is at least two times longer than the respective tibial plate section width,
- wherein the width of each of the plate sections is substantially uniform along the length of each of the respective tibial plate sections,
- wherein the epiphyseal tibial plate section length is shorter than the metaphyseal tibial plate section length, and
- further wherein each of the cut-adjacent curvilinear surfaces generally matches a shape of the curvilinear cut and is curved in the same direction as the other cut-adjacent curvilinear surface for alignment along the curvilinear cut.

11. The implant device of claim 10, wherein each of the tibial plate sections comprises two (2) to eight (8) screw holes and a curvilinear shape.

12. The implant device of claim 10, wherein the ligament comprises a ligament length defined along an axis substantially parallel to an axis defined by each of the epiphyseal and metaphyseal tibial plate section lengths, the ligament length is at least 50% shorter than each of the epiphyseal and metaphyseal tibial plate section lengths.

13. The implant device of claim 12, wherein the ligament further comprises a ligament width from 4 mm to 10 mm and a ligament length from 4 mm to 12 mm, and further wherein each of the plate sections and the ligament comprises a thickness from 1.5 mm to 4 mm.

14. The implant device of claim 10, wherein the width of each of the tibial plate sections along the length of each of the respective tibial plate sections is both uniform and varies by no more than ±5%.

15. The implant device of claim 10, wherein the epiphyseal tibial plate section length is from 8 mm to 36 mm, the epiphyseal tibial plate section width is from 4 mm to 10 mm, the metaphyseal tibial plate section length is from 10 mm to 38 mm, and the metaphyseal tibial plate section width is from 4 mm to 10 mm.

16. The implant device of claim 10, wherein each of the tibial plate sections comprises a cut-adjacent curvilinear surface that is substantially normal to its bone-contacting surface, the curvilinear surface comprising a plate radius within ±25% of the curvilinear cut radius.

17. The implant device of claim 10, wherein one of the at least two screw holes of the epiphyseal plate section is elongated in a direction perpendicular to the curvilinear tibial cut.

18. An implant device for a tibial plateau leveling osteotomy, consisting essentially of:
- an epiphyseal tibial plate section comprising at least two screw holes and a bone-contacting surface, each screw hole of the epiphyseal tibial plate configured to accept a bone screw to secure the plate section to an epiphyseal tibial bone fragment;
- a metaphyseal tibial plate section comprising at least two screw holes and a bone-contacting surface, each screw hole of the metaphyseal tibial plate section configured to accept a bone screw to secure the plate section to a metaphyseal tibial bone fragment; and
- a ligament configured to join the tibial plate sections and to span a curvilinear tibial cut, wherein the curvilinear cut comprises a curvilinear cut radius and separates the epiphyseal and metaphyseal tibial fragments,
- wherein each of the epiphyseal and metaphyseal tibial plate sections and the ligament comprises an implant grade alloy,
- wherein the epiphyseal tibial plate section comprises an epiphyseal tibial plate section length and width, the metaphyseal tibial plate section comprises a metaphyseal tibial plate section length and width, and each tibial plate section length is at least two times longer than the respective tibial plate section width,
- wherein the width of each of the plate sections is substantially uniform along the length of each of the respective tibial plate sections, and
- further wherein each of the cut-adjacent curvilinear surfaces generally matches a shape of the curvilinear cut and is curved in the same direction as the other cut-adjacent curvilinear surface for alignment along the curvilinear cut.

19. The implant device of claim 18, wherein each of the tibial plate sections comprises two (2) to eight (8) screw holes and a curvilinear shape.

20. The implant device of claim 18, wherein the ligament comprises a ligament length defined along an axis substantially parallel to an axis defined by each of the epiphyseal and metaphyseal tibial plate lengths, the ligament length is at least 50% shorter than each of the epiphyseal and metaphyseal tibial plate lengths, and further wherein the ligament comprises a ligament width, the ligament width is from 4 mm to 10 mm, and the ligament length is from 4 mm to 12 mm.

21. The implant device of claim 18, wherein each of the plate sections and the ligament comprises a thickness from 1.5 mm to 4 mm, and further wherein the epiphyseal tibial plate section length is from 8 mm to 36 mm, the epiphyseal tibial plate section width is from 4 mm to 10 mm, the metaphyseal tibial plate length is from 10 mm to 38 mm, and the metaphyseal tibial plate width is from 4 mm to 10 mm.

22. The implant device of claim 18, wherein each of the tibial plate sections comprises a cut-adjacent curvilinear surface that is substantially normal to its bone-contacting surface, the curvilinear surface comprising a plate radius within ±25% of the curvilinear cut radius, and further wherein the epiphyseal tibial plate length is shorter than the metaphyseal tibial plate length.

23. The implant device of claim 18, wherein one of the at least two screw holes of the epiphyseal plate section is elongated in a direction perpendicular to the curvilinear tibial cut.

24. An implant device for a tibial plateau leveling osteotomy, comprising:
  an epiphyseal tibial plate section comprising at least two screw holes and a bone-contacting surface, each screw hole of the epiphyseal tibial plate configured to accept a bone screw to secure the plate section to an epiphyseal tibial bone fragment;
  a metaphyseal tibial plate section comprising at least two screw holes and a bone-contacting surface, each screw hole of the metaphyseal tibial plate section configured to accept a bone screw to secure the plate section to a metaphyseal tibial bone fragment; and
  a ligament configured to join the tibial plate sections and to span a curvilinear tibial cut, wherein the curvilinear cut comprises a curvilinear cut radius and separates the epiphyseal and metaphyseal tibial fragments,
  wherein each of the epiphyseal and metaphyseal tibial plate sections and the ligament comprises an implant grade alloy,
  wherein the epiphyseal tibial plate section comprises an epiphyseal tibial plate section length and width, the metaphyseal tibial plate section comprises a metaphyseal tibial plate section length and width, and each tibial plate section length is at least two times longer than the respective tibial plate section width,
  wherein the width of each of the plate sections is substantially uniform along the length of each of the respective tibial plate sections, and
  further wherein one or both of the tibial plate sections comprises a support protrusion, the support protrusion comprising a screw hole and emanating from a surface of the plate section opposite to a cut-adjacent curvilinear surface of the plate section that is substantially normal to its bone-contacting surface.

25. The implant device of claim 24, wherein each support protrusion comprises a width that is no more than 100% of the width of the respective plate section.

26. The implant device of claim 24, wherein each of the tibial plate sections comprises two (2) to eight (8) screw holes and a curvilinear shape.

27. The implant device of claim 24, wherein the ligament comprises a ligament length defined along an axis substantially parallel to an axis defined by each of the epiphyseal and metaphyseal tibial plate lengths, the ligament length is at least 50% shorter than each of the epiphyseal and metaphyseal tibial plate lengths, and further wherein the ligament comprises a ligament width, the ligament width is from 4 mm to 10 mm, and the ligament length is from 4 mm to 12 mm.

28. The implant device of claim 24, wherein each of the plate sections and the ligament comprises a thickness from 1.5 mm to 4 mm, and further wherein the epiphyseal tibial plate section length is from 8 mm to 36 mm, the epiphyseal tibial plate section width is from 4 mm to 10 mm, the metaphyseal tibial plate length is from 10 mm to 38 mm, and the metaphyseal tibial plate width is from 4 mm to 10 mm.

29. The implant device of claim 24, wherein each of the tibial plate sections comprises a cut-adjacent curvilinear surface that is substantially normal to its bone-contacting surface, the curvilinear surface comprising a plate radius within ±25% of the curvilinear cut radius, and further wherein the epiphyseal tibial plate length is shorter than the metaphyseal tibial plate length.

30. The implant device of claim 24, wherein one of the at least two screw holes of the epiphyseal plate section is elongated in a direction perpendicular to the curvilinear tibial cut.

* * * * *